Figure 1:
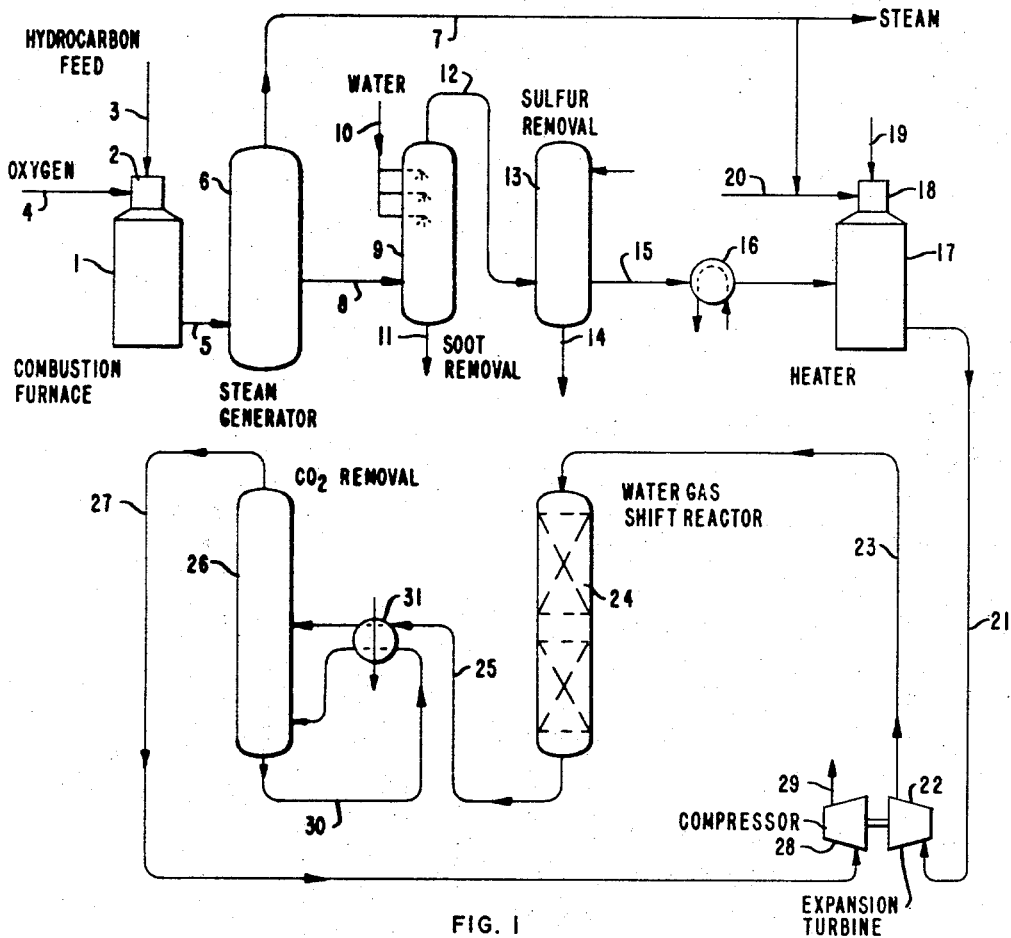

Dec. 24, 1968 L. W. TER HAAR 3,418,082
PROCESS FOR THE PREPARATION OF A HYDROGEN-CONTAINING GAS MIXTURE
Filed Sept. 13, 1966 2 Sheets-Sheet 1

INVENTOR:
LEONARD W. TER HAAR

BY: *Harold L. Denkler*

HIS ATTORNEY

United States Patent Office 3,418,082
Patented Dec. 24, 1968

3,418,082
PROCESS FOR THE PREPARATION OF A HYDROGEN-CONTAINING GAS MIXTURE
Leonard W. Ter Haar, The Hague, Netherlands, assignor to Shell Oil Company, New York, N.Y., a corporation of Delaware
Filed Sept. 13, 1966, Ser. No. 579,108
Claims priority, application Netherlands, Sept. 13, 1965, 6511884
7 Claims. (Cl. 23—213)

This invention relates to a process for the preparation of a hydrogen-containing gas mixture at high pressure.

There is a great need in the chemical and petrochemical industry for hydrogen-containing gas mixtures, such as for the preparation of methanol and oxo-alcohols (carbon monoxide and hydrogen in a prescribed ratio) or ammonia (hydrogen and nitrogen). These processes generally are carried out at high pressure (about 300 atm.). This invention relates to a process for preparing such gases in a highly efficient manner.

In general outline, the present process comprises subjecting a hydrocarbon to partial combustion at a pressure above about 50 atmospheres to obtain a partial combustion gas at a high temperature and pressure, expanding the combustion gas through a gas expansion turbine, subjecting the expanded gas to a water gas shift reaction, removing carbon dioxide from the shift reaction product to obtain a resulting hydrogen-containing gas and compressing at least a portion of the resulting gas by a compressor driven by the gas turbine.

In a specific embodiment of the invention, pressure of the partially combusted gases before expansion in the gas turbine is at least 50 atmospheres. The gases are expanded to a pressure of about 20 to 40 atmospheres, at which pressure the shift reaction is carried out at a temperature in the range from about 200 to 400° C.

The catalytic conversion of carbon monoxide to carbon dioxide should be carried out at a pressure lower than that which is available as a result of the high pressure partial combustion of hydrocarbon with oxygen. The reason for this measure lies in the fact that the catalytic conversion of carbon monoxide to carbon dioxide at high pressure, although theoretically feasible, involves exceptionally high capital outlays for equipment. Too, this part of the process is very hard to carry out, inter alia because condensation of some of the steam at the high pressure restricts the available steam/gas ratio.

By expanding the gas mixture comprising hydrogen and carbon monoxide to the desired pressure for the shift conversion in one or more gas turbines, it is possible for the energy thus released to be re-used in the process for driving one or more compressors, which can be used to bring the hydrogen-containing end gas to the desired pressure required for further processing in a chemical process; namely, pressures of at least 100 atm. Therefore, in the process of the invention the pressure and/or temperature desired for the catalytic conversion of carbon monoxide to carbon dioxide can be obtained exclusively by expanding the gas mixture in the gas turbine(s).

In one embodiment of the invention steam required for the conversion of carbon monoxide in the shift reaction is introduced into the gas mixture in a sufficient quantity by effecting the partial combustion of hydrocarbon in the presence of added steam (steam-moderated combustion). This not only provides steam for the conversion but it also helps to bring the gas mixture to the desired temperature for the gas turbine.

It may be desirable to purify the gas mixture from the partial combustion. This is done preferably before the mixture is expanded in the turbine(s). This gas purification may involve the removal of hydrogen sulfide and clearly, it should preferably take place before the gases are used in the gas turbines(s) in order to prevent detrimental effects on the turbine blades from the sulfur or sulfur compounds present. Moreover, gas purification is effected more economically at high pressure than at low pressure.

The gas purification may also involve the removal of soot particles from the gas mixture. This is of particular importance when the gas mixture is obtained by partial combustion of heavy hydrocarbons with oxygen, in which the formation of a small percentage of free carbon in the form of fine soot particles is known to be inevitable.

If the starting materials are hydrocarbons in which the formation of soot particles is to be expected, it is preferred to first cool the hot gas mixture in a heat exchanger, and then to remove the soot by contacting the gas stream with water and possibly steam, the soot being separated from the gas mixture in the form of an aqueous soot suspension, after which the gas mixture is reheated to a high temperature by admixture with a hot gas produced by combustion of a hydrocarbon having a final boiling point of at most 400° C. with oxygen, steam and possibly air.

An advantage of this method is that relatively cheap, heavy hydrocarbons can be used as the main combustion component, while only a part of the hydrocarbon feed, namely that required solely for heating up cooled purified synthesis gas, need consist of a lighter and more expensive fraction. If desired, the purified gas, too, may serve as fuel. For combustion, it is preferred to supply only 90–100% of the oxygen stoichiometrically required for burning to carbon monoxide (or carbon dioxide when the purified combustion gas is used) in order to avoid the presence of free oxygen in the combustion product. Moreover, in this second stage combustion, air can be supplied for the combustion of that part of the hydrocarbon feed which is introduced into the gas stream, which is of advantage if the end gas is used for the preparation of ammonia.

The heat exchanger used to cool the combustion gases prior to soot removal preferably consists of a steam generator. Water in the steam generator is converted by the hot gas stream to steam having a pressure of at least 80 atm. This high-pressure steam can be used advantageously in the process. It is also of advantage at times if one or more catalytic afterburners are included in the process. A hydrocarbon feed with a final boiling point of at most 300° C. is partially combusted with oxygen and possibly air in the afterburner, the resulting combustion gases being added to the existing gas mixture, as a result of which the formation of free carbon and/or methane in the gas mixture is suppressed and at the same time additional synthesis gas is produced. Such an afterburner can, for example, be installed before the gas mixture is expanded in the gas turbine. It will be clear that in this case, the quantity of hydrocarbon feed required for raising the temperature of the gas mixture, together with the amount of oxygen, steam and/or air required for combustion can be apportioned over the afterburner and the other combustion equipment.

If the hydrocarbon feed is a relatively light hydrocarbon fraction, for example with a final boiling point of at most 300° C., the soot removal step as described above can often be omitted, one or more afterburners being sufficient. It is also possible to effect the expansion of the gas mixture in stages and in such case to place a separate afterburner between the expansion stages.

The invention will now be illustrated with reference to the drawing. The example selected is a process for the production of a hydrogen-containing gas mixture to be used in the preparation of ammonia, so that the end gas also contains nitrogen. Consequently air is supplied as oxidizing agent at appropriate places, and in this way nitrogen is introduced as well.

Figure 2:
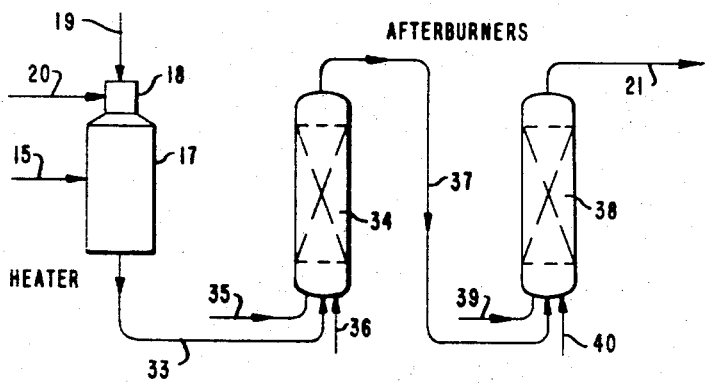
Figure 3:
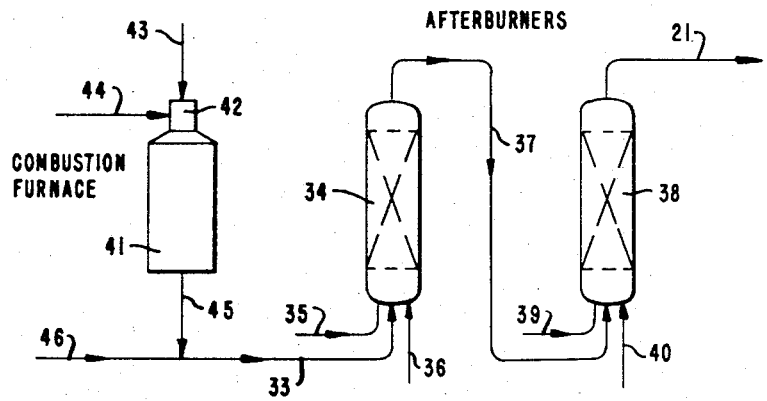
Figure 4:
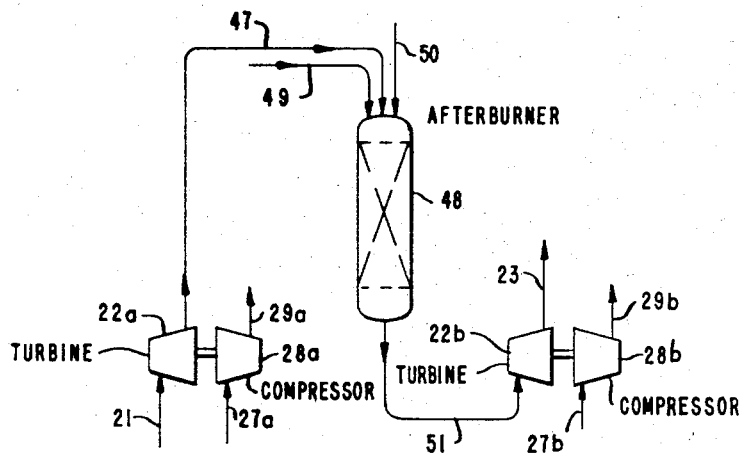

Referring to the drawing, FIGURE 1 is a flow diagram of one embodiment of the invention; FIGURE 2 is a diagram of a modified detail involving the use of afterburners in the process shown in FIGURE 1; FIGURE 3 is a diagram of part of a modified embodiment according to the invention for use with low sulfur feeds and finally FIGURE 4 is a diagram of a modified detail involving the use of afterburners between expansion stages as may be used in combination with any of the other embodiments shown.

In the various figures identical elements are indicated by the same reference numerals.

With reference to FIGURE 1, the starting material is a relatively heavy hydrocarbon, for example, having a hydrogen content of only 11%. With such a feed, appropriate measures for the removal of the soot from this gas are included in the process.

Partial combustion of the hydrocarbon is effected in reactor 1, the hydrocarbon feed being introduced into the top 2 of the reactor via a supply line 3. Oxygen and steam advantageously are supplied to the top of the reactor via line 4. Sufficient oxygen is introduced for combustion to carbon monoxide but insufficient for complete combustion to carbon dioxide. The partial combustion gas, which in the reactor has a temperature of about 1450° C., is passed via a discharge line 5 to a steam generator 6. High-pressure steam, at a pressure of about 80 atm. leave the steam generator via a discharge line 7. This steam can, of course, be used in the process as indicated by a branching of line 7, which supplies some of the steam to line 20 (see below).

The combustion gas, cooled to about 300°–400° C., is passed to gas scrubber 9 via line 8. In the gas scrubber, water in a finely divided state is introduced into the hot gas stream by means of nozzles connected to water supply lines 10. Soot particles are taken up by the water and leave the gas scrubber via discharge line 11 in the form of an aqueous soot suspension. After being further cooled to about 40° C., the purified gas mixture is subsequently transferred via line 12 to a vessel 13 for the removal of sulfur compounds, in particular hydrogen sulfide. This is usually done by means of absorption liquids. Such absorption liquids include, for example, aqueous solutions of alkanol amines (for example monoethanolamine, diethanolamine, di-n-propanolamine and/or diisopropanolamine), of potassium phosphate, of a caustic soda solution and of mixtures of cyclotetramethylene sulfone (or derivatives thereof) with alkanol amines. Other purifying agents, for example, the iron oxide-containing mixtures used for the purification of town gas, may likewise be employed. If the gas contains other sulfur compounds as well, for example carbonyl sulfide, in a content which is too high for the gas to be able to meet the relevant requirements, appropriate measures should also be taken to remove at least part thereof from the gas. Lean absorbent is introduced at the top of vessel 13, and rich absorbent is removed from the bottom of the vessel via line 14.

The purified gas mixture is subsequently passed to heating vessel 17 via line 15; if desired, a heat exchanger 16 may be installed before the heating vessel. To the top 18 of heating vessel 17, a relatively light hydrocarbon is supplied via supply line 19, oxygen, air and optionally steam being supplied via supply line 20. In the top of the heating vessel, the hydrocarbon feed is completely burned at a temperature of about 1450° C. In the lower part of vessel 17, this gas mixes with the gas stream supplied via line 15. The amount of hydrocarbon burned is sufficient to provide a gas mixture having a temperature of about 800° C. This mixture is discharged via line 21 and is passed through turbine 22, in which the gas mixture expands to a pressure of 20–40 atm., the ultimate temperature being in the range of from 200° to 400° C.

Cooling is effected only by expansion. The mixture is subsequently transferred via line 23 to vessel 24 filled with a conventional water gas shift catalyst, in which carbon monoxide is catalytically converted with steam into hydrogen and carbon dioxide. The gas mixture is passed via line 25 to vessel 26, in which the carbon dioxide is removed from the mixture in a manner known per se, for example, by supplying a suitable absorbent. The absorbent can be water but is preferably one of the conventional alkaline solutions such as alkanolamine or a solution of $Na_2CO_3$—$NaHCO_3$, $NaOH$, or the like. The gas mixture finally leaves vessel 26 via line 27.

The gas mixture comprising hydrogen and nitrogen thus obtained is passed via line 27 to compressor 28, which is driven by turbine 22. In the compressor, the gas mixture is brought to a pressure of 150–300 atm. and is discharged through line 29 for transfer to the ultimate end use. If desired, the vessel 26 can be provided with a recirculating line 30, in which a heat exchanger 31 is included, the gas mixture in the line 25 forming the other heat exchange medium.

FIGURE 2 shows a modification representing a detail of the scheme shown in FIGURE 1, viz. that part which is situated between the heating vessel 17 and the line 21.

According to this modification, two additional afterburners are included, viz. an afterburner 34, into which line 33 issues and to which at the same time a light hydrocarbon is supplied via line 35, with oxygen, air and optionally steam being supplied via line 36. In this catalytic afterburner, filled, for example, with a nickel catalyst, the presence in the end gas of free carbon as well as methane is suppressed. The mixture is transferred via line 37 to a second afterburner 38 which is provided with lines 39 for hydrocarbon and 40 for oxygen, air and optionally steam, whereupon the gas ultimately is passed into line 21. In this example, then, the afterburning takes place in two steps.

The scheme according to FIGURE 3 shows a modified version of the process according to the invention. Instead of using sulfur-containing hydrocarbons as starting material, with a combined reactor/steam generator followed by a gas purification step, the feed employed in this case is a light hydrocarbon of low sulfur content.

At its top 42, reactor 41 receives this light hydrocarbon feed via line 43, oxygen and advantageously steam being supplied via line 44. In the reactor 41, a combustion product is formed which contains substantially no free soot particles. This gas mixture is discharged from the reactor via line 45 and is combined with steam and/or water supplied via line 46. The gas mixture thus formed, which has a temperature of about 800° C. and a pressure of 60–300 atm., is passed directly through two afterburners which are similar to the afterburners described in FIGURE 2. A gas mixture of the desired composition and pressure is passed to the turbine via line 21. The rest of this process is similar to that described with reference to FIGURE 1.

When one or more afterburners are used and additional heating is required for one overcooled gas mixture, the total quantity of hydrocarbon feed, as well as oxygen, air and steam required for the heating or reheating process, are apportioned in a suitable manner between the various elements of the process.

Finally, FIGURE 4 shows part of a process scheme which is a further modification of the processes described in the foregoing. This concerns the part in which the turbine compressor set is involved. In this figure, expansion of the gas takes place in two stages, viz. in turbines 22a and 22b. In this case the compression also takes place in two separate compressors, viz. compressors 28a and 28b. Between the two expansion stages of the turbine an additional afterburner 48 is included, to which the gas partly expanded, viz a pressure of about 40–80 atm. and a temperature of about 400° C., is supplied via line 47. Hydrocarbon feed is supplied to the afterburner via line 49, the supply of oxygen, steam and air being introduced via line 50. In this case, the gas mixture leaving the afterburner 48 via line 51 has retained its pressure of 40–80 atm. but its temperature has been increased to about 800° C. The gas mixture leaving the second turbine 22b will then, in line 23, have a pressure of 20–40 atm. and a temperature of 200–400° C. The two compressors 28a and 28b can be connected either in parallel or in series. In the former case the gas supplied via lines 27a and 27b respectively is brought to the desired pressure at once. In this case the lines 29a and 29b connect into a common line for passage to ultimate use, for ammonia manufacture in this case.

The use of gas turbines in the process stream offers various attractive advantages. With the placing of a gas turbine before the inlet of vessel 24, carbon monoxide can be converted at a suitable pressure of about 20–40 atm., the capital outlay for the required equipment being low. As a result of heating the hot gas stream for the turbine by direct mixing with a combustion product, no heat is lost, for example, through a stack. For such heating, an oxidizing agent comprising of oxygen, nitrogen and steam, i.e. air may be used. As a result, the steam content in the gas mixture is increased so that no separate equipment need be included to provide the gas mixture with steam for the conversion of carbon monoxide. It should be borne in mind, however, that the gas turbine outlet temperature should be maintained at a sufficiently high level to prevent condensation of steam. On the other hand, since the steam is also passed through the gas turbine, maximum output of the gas turbine is obtained. The removal of any sulfur-containing components present in the gas preferably is effected before the gas mixture is passed through the turbine. Although this implies an extra step, this does not detract from the advantage that a sulfur-containing fuel can be used as starting material.

I claim as my invention:

1. A process for preparing high pressure hydrogen-containing gas which comprises subjecting a hydrocarbon to partial combustion at a pressure above about 50 atmospheres, expanding through a gas expansion turbine to a pressure of about 20 to 40 atmospheres, subjecting the expanded gases to a water gas shift reaction, removing carbon dioxide from the reacted gases, and compressing at least a portion of the resulting gas from the carbon dioxide removal step by means of a compressor driven by the gas turbine.

2. The process according to claim 1 wherein the combustion gases are expanded to a temperature of about 200 to 400° C.

3. The process according to claim 1 wherein impurities selected from the group consisting of soot, sulfur compounds, and mixtures thereof are removed from the combustion gases prior to expansion of the gases in the turbine.

4. The process according to claim 1 wherein the amount of oxygen supplied for the partial combustion is from about 90–100% of the stoichiometric amount required for converting carbon in the hydrocarbon to carbon monoxide.

5. The process according to claim 1 wherein the partial combustion is carried out in the presence of steam.

6. The process according to claim 3 wherein cool gases from the impurity removal step are heated to about 800° C.

7. The process according to claim 1 wherein the gas expansion is carried out in two stages, the temperature of the gas from the first stage being increased before entering the second stage.

References Cited

UNITED STATES PATENTS

| 1,157,669 | 10/1915 | Bosch et al. | 23—213 |
| 2,632,689 | 3/1953 | Lathum | 23—153 |
| 2,870,096 | 1/1959 | Baumann | 23—213 XR |
| 3,074,783 | 1/1963 | Paull | 23—213 XR |

FOREIGN PATENTS

| 392,427 | 5/1933 | Great Britain. |
| 850,282 | 10/1960 | Great Britain. |

EARL C. THOMAS, Primary Examiner.

E. STERN, Assistant Examiner.

U.S. Cl. X.R.

23—212; 48—196; 252—373, 376